US010081928B2

(12) United States Patent
Wu

(10) Patent No.: US 10,081,928 B2
(45) Date of Patent: Sep. 25, 2018

(54) SHOVEL AND CONTROL METHOD THEREOF

(71) Applicant: SUMITOMO HEAVY INDUSTRIES, LTD., Tokyo (JP)

(72) Inventor: Chunnan Wu, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/382,891

(22) Filed: Dec. 19, 2016

(65) Prior Publication Data

US 2017/0101761 A1   Apr. 13, 2017

Related U.S. Application Data

(63) Continuation of application No. PCT/JP2015/067505, filed on Jun. 17, 2015.

(30) Foreign Application Priority Data

Jun. 20, 2014 (JP) .................................. 2014-127672

(51) Int. Cl.
*E02F 3/43* (2006.01)
*E02F 3/32* (2006.01)
(Continued)

(52) U.S. Cl.
CPC ................ *E02F 3/435* (2013.01); *E02F 3/32* (2013.01); *E02F 9/22* (2013.01); *E02F 9/2235* (2013.01); *G01S 19/42* (2013.01)

(58) Field of Classification Search
None
See application file for complete search history.

(56) References Cited

U.S. PATENT DOCUMENTS 4,807,131 A * 2/1989 Clegg ..................... E02F 3/842
                                                                172/4.5
5,005,652 A * 4/1991 Johnson .................. E02F 3/845
                                                                172/1

(Continued)

FOREIGN PATENT DOCUMENTS

JP     S62-160325     7/1987
JP     H08-027840     1/1996
(Continued)

OTHER PUBLICATIONS

International Search Report dated Sep. 15, 2015.

*Primary Examiner* — Redhwan K Mawari
*Assistant Examiner* — Edward Torchinsky
(74) *Attorney, Agent, or Firm* — IPUSA, PLLC

(57) ABSTRACT

A shovel may include a lower travelling body, an upper swinging body mounted on the lower travelling body, an excavation attachment attached to the upper swinging body, an orientation detecting device configured to detect an orientation of the excavation attachment, and a controller. The controller may have a ground surface shape information obtaining part that obtains information relating to a current shape of an excavation target ground surface based on a transition of the orientation of the excavation attachment detected by the orientation detecting device, and an excavation controlling part that controls the excavation attachment based on the information relating to the current shape of the excavation target ground surface obtained by the ground surface shape information obtaining part.

9 Claims, 11 Drawing Sheets

(51) Int. Cl.
*E02F 9/22* (2006.01)
*G01S 19/42* (2010.01)

(56) References Cited

U.S. PATENT DOCUMENTS

| | | | | |
|---|---|---|---|---|
| 5,854,988 | A | * | 12/1998 | Davidson .................. E02F 9/26 37/414 |
| 6,047,227 | A | | 4/2000 | Henderson et al. |
| 6,363,632 | B1 | * | 4/2002 | Stentz .................... E02F 3/437 37/348 |
| 6,453,227 | B1 | * | 9/2002 | Kalafut .................... E02F 9/26 701/300 |
| 6,736,216 | B2 | * | 5/2004 | Savard .................. E01C 19/006 172/1 |
| 7,113,105 | B2 | * | 9/2006 | Sahm ...................... E02F 9/26 172/4.5 |
| 9,315,969 | B2 | * | 4/2016 | Uchiyama ............ E02F 9/2246 |
| 9,651,381 | B2 | * | 5/2017 | Clar ...................... G01C 21/20 |
| 9,816,253 | B2 | * | 11/2017 | Yasuda .................. E02F 9/261 |
| 2005/0046599 | A1 | | 3/2005 | Sahm et al. |
| 2008/0082238 | A1 | * | 4/2008 | Mannepalli ............ E02F 3/842 701/50 |
| 2012/0296510 | A1 | | 11/2012 | Kawashima |
| 2014/0100712 | A1 | | 4/2014 | Nomura et al. |
| 2015/0007557 | A1 | | 1/2015 | Egawa et al. |
| 2016/0010312 | A1 | | 1/2016 | Kurihara et al. |

FOREIGN PATENT DOCUMENTS

| | | |
|---|---|---|
| JP | 2005-076448 | 3/2005 |
| JP | 2006-214246 | 8/2006 |
| JP | 2010-230061 | 10/2010 |
| JP | 2013-002058 | 1/2013 |
| JP | 2013-200023 | 10/2013 |
| JP | 2014-074315 | 4/2014 |
| WO | 2011/092837 | 8/2011 |
| WO | 2014-077221 | 5/2014 |

* cited by examiner

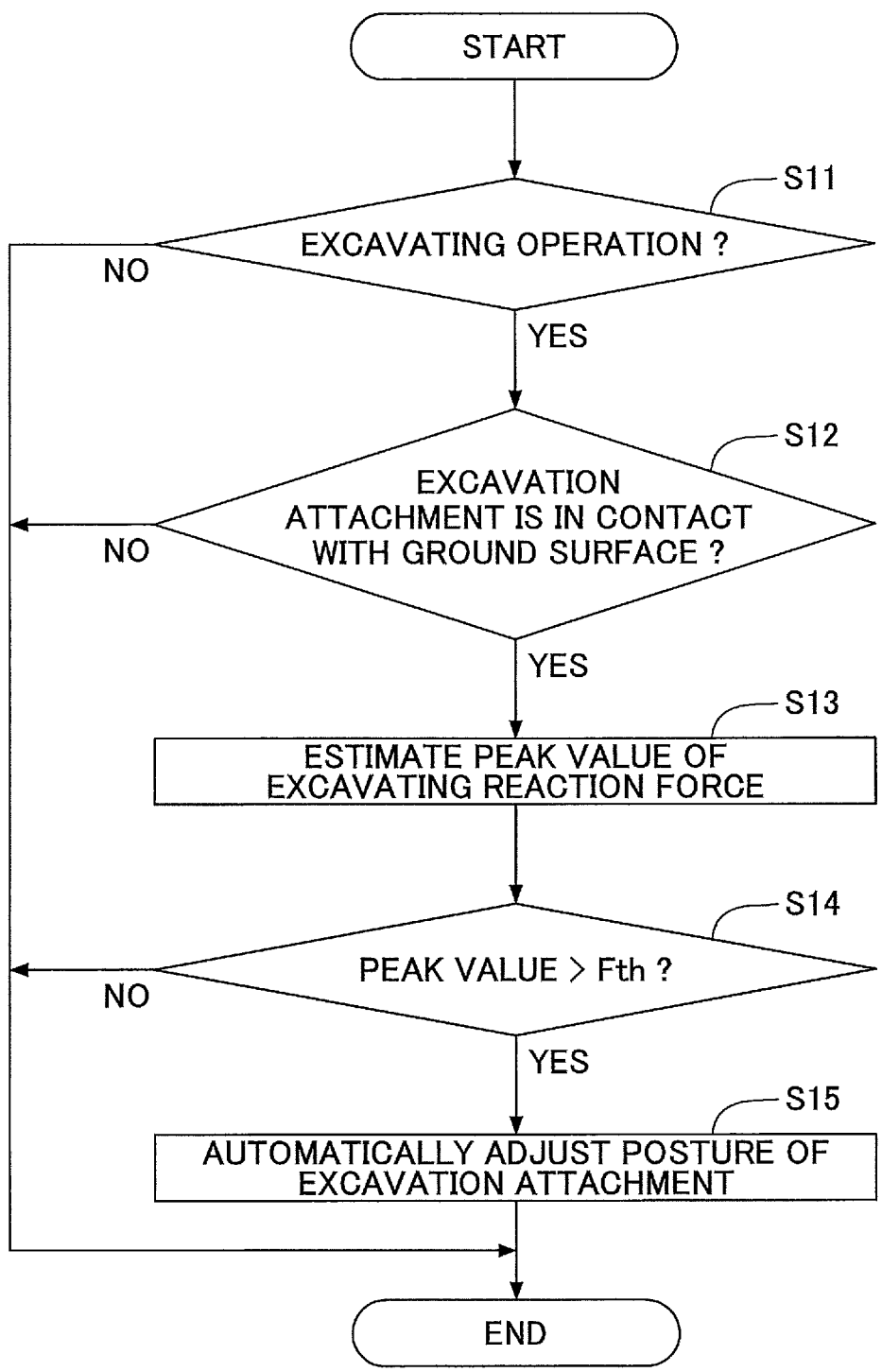

SHOVEL AND CONTROL METHOD THEREOF

RELATED APPLICATION

This application is a continuation application of International Application No. PCT/JP2015/067505 filed on Jun. 17, 2015 and designated the U.S., which is based upon and claims the benefit of priority of Japanese Patent Application No. 2014-127672, filed on Jun. 20, 2014, the entire contents of which are incorporated herein by reference.

BACKGROUND

Technical Field

The present invention relates to a shovel provided with an attachment and to a control method thereof.

Description of Related Art

A shovel having a variable contraction that increases and decreases a flow rate of a hydraulic oil flowing out of a rod side hydraulic chamber of an arm cylinder when closing an arm is known. This shovel monitors a pressure in a bottom side hydraulic chamber of the arm cylinder to control the variable contraction. This is because it can determine that a bucket is not in contact with a ground surface and an excavation attachment is moving in the air when the pressure in the bottom side hydraulic chamber is lower than a predetermined value, and can determine that a flow rate of the hydraulic oil flowing through the variable contraction is to be decreased lest the arm should descend under its own weight. Also, this is because it can determine that a bucket is in contact with the ground surface when the pressure in the bottom side hydraulic chamber is greater than or equal to the predetermined value, and can determine that a flow rate of the hydraulic oil flowing through the variable contraction is to be increased lest an unnecessary pressure loss should is generated at the variable contraction.

However, the above shovel can determine whether to decrease or increase a flow rate of the hydraulic oil flowing through the variable contraction only after a contact of the bucket and the ground surface has been detected based on the pressure in the bottom side hydraulic chamber of the arm cylinder. As a result, it cannot increase the flow rate at the start of excavation. Thus, it generates an unnecessary pressure loss at the variable contraction and decrease working efficiency of the shovel. This is due to the fact that it cannot preliminarily determine when the bucket gets in contact with the ground surface since it has not recognized a current shape of the ground surface to be excavated.

SUMMARY

According to an embodiment of the present invention, there is provided a shovel including a lower travelling body, an upper swinging body mounted on the lower travelling body, an attachment attached to the upper swinging body, an orientation detecting device configured to detect an orientation of the attachment, and a control device, wherein the control device obtains information relating to a current shape of a ground surface that is a work target, based on a transition of the orientation of the attachment detected by the orientation detecting device, and controls the attachment based on the obtained information relating to the current shape of the ground surface.

BRIEF DESCRIPTION OF THE DRAWINGS

FIG. 11 is a flowchart illustrating a flow of an automatic orientation adjusting process.

DETAILED DESCRIPTION

In view of the related art described above, it is desirable to provide a shovel that can recognize a current shape of a ground surface to be excavated.

Figure 1:
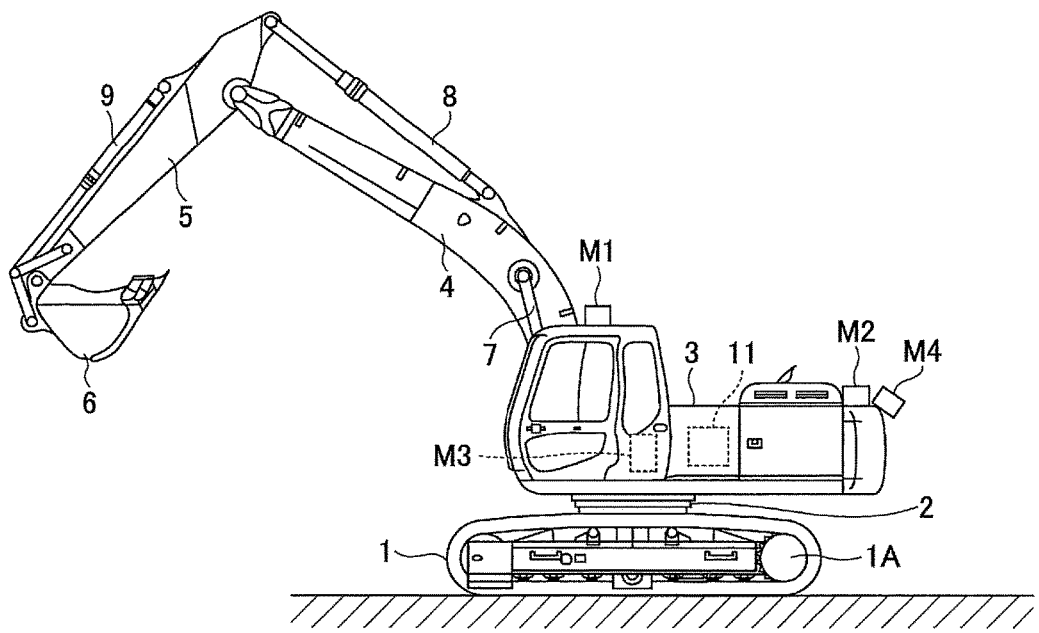
FIG. 1 is a side view of a shovel according to an embodiment of the present invention.

First, referring to FIG. 1, a shovel (an excavator) as a construction machine according to an embodiment of the present invention will be explained. FIG. 1 is a side view of a shovel according to an embodiment of the present invention. On a lower travelling body 1 of the shovel illustrated in FIG. 1, an upper swinging body 3 is mounted via a swing mechanism 2. A boom 4 is attached to the upper swinging body 3. An arm 5 is attached to an end of the boom 4, and a bucket 6 is attached to an end of the arm 5. The boom 4, arm 5, and bucket 6 as working elements constitute an excavation attachment as an example of an attachment. The attachment may be another attachment such as a floor digging attachment, a leveling attachment, a dredging attachment, or the like. Also, the boom 4, arm 5, and bucket 6 are hydraulically actuated by a boom cylinder 7, an arm cylinder 8 and a bucket cylinder 9, respectively. A cabin 10 is provided on the upper swinging body 3, and a power source such as an engine 11 or the like is mounted on the upper swinging body 3. Also, a communication device M1, a positioning device M2, an orientation detecting device M3, and an imaging device M4 are attached to the upper swinging body 3.

The communication device M1 is a device that controls a communication between the shovel and the outside. In the present embodiment, the communication device M1 controls a wireless communication between a Global Navigation Satellite System (GNSS) survey system and the shovel. Specifically, the communication device M1 obtains terrain information of a workplace at the start of a work by shovel at a frequency of, for example, once a day. The GNSS survey system employs the network RTK-GNSS survey system, for example.

The positioning device M2 is a device that determines a position and a direction of the shovel. In the present embodiment, the positioning device M2 is a GNSS receiver incorporating an electronic compass. It determines latitude, longitude, and altitude of an actual location of the shovel, and determines a direction of the shovel. The direction of the shovel, for example, corresponds to a direction of the upper swinging body 3 and to a direction of the attachment. It has no connection to a direction of the lower travelling body 1. The lower travelling body 1 moves forward or backward in response to an inclination direction of a travel lever that is one of an operating device 26 (see FIG. 3). And, a side where a hydraulic travel motor 1A (left) and a hydraulic travel motor 1B (right, invisible) are arranged (a right side in FIG. 1) corresponds to a rear side of the lower travelling body 1.

The orientation detecting device M3 is a device that detects an orientation of an attachment. In the present embodiment, the orientation detecting device M3 is a device that detects an orientation of the excavation attachment.

The imaging device M4 is a device that captures an image representing scenery around the shovel. In the present embodiment, the imaging device M4 is a camera attached to the upper swinging body 3 of the shovel. It obtains terrain information of a workplace by recognizing a distance to a ground surface around the shovel based on the captured image. The imaging device M4 may be a stereo camera, a range image camera, a three-dimensional laser scanner, or the like.

Figure 2:
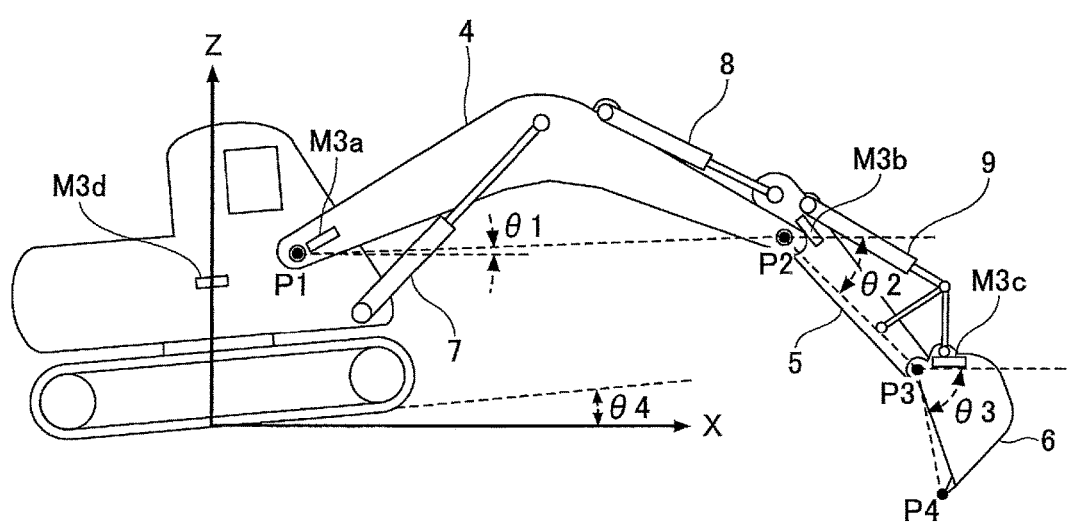
FIG. 2 is a side view of a shovel illustrating an example of output contents of various sensors constituting an orientation detecting device mounted to the shovel in FIG. 1.

FIG. 2 is a side view of the shovel and illustrates an example of output contents of various sensors that constitute the orientation detecting device M3 mounted on the shovel in FIG. 1. Specifically, the orientation detecting device M3 includes a boom angle sensor M3$a$, an arm angle sensor M3$b$, a bucket angle sensor M3$c$, and a machine body inclination sensor M3$d$.

The boom angle sensor M3$a$ is a sensor that obtains a boom angle $\theta1$. It includes, for example, a rotational angle sensor that detects a rotational angle of a boom foot pin, a stroke sensor that detects a stroke amount of the boom cylinder 7, an inclination (acceleration) sensor that detects an inclination angle of the boom 4, or the like. The boom angle $\theta1$ is an angle of a line segment connecting a boom foot pin position P1 and an arm coupling pin position P2 with respect to the horizontal line in the XZ plane.

The arm angle sensor M3$b$ is a sensor that obtains an arm angle $\theta2$. It includes, for example, a rotational angle sensor that detects a rotational angle of an arm coupling pin, a stroke sensor that detects a stroke amount of the arm cylinder 8, an inclination (acceleration) sensor that detects an inclination angle of the arm 5, or the like. The arm angle $\theta2$ is an angle of a line segment connecting the arm coupling pin position P2 and a bucket coupling pin position P3 with respect to the horizontal line in the XZ plane.

The bucket angle sensor M3$c$ is a sensor that obtains a bucket angle $\theta3$. It includes, for example, a rotational angle sensor that detects a rotational angle of a bucket coupling pin, a stroke sensor that detects a stroke amount of the bucket cylinder 9, an inclination (acceleration) sensor that detects an inclination angle of the bucket 6, or the like. The bucket angle $\theta3$ is an angle of a line segment connecting the bucket coupling pin position P3 and a bucket tooth tip position P4 with respect to the horizontal line in the XZ plane.

The machine body inclination sensor M3$d$ is a sensor that obtains a Y-axis inclination angle $\theta4$ of the shovel and an X-axis inclination angle $\theta5$ (not shown) of the shovel. It includes, for example, a biaxial inclination (acceleration) sensor, or the like. The XY plane in FIG. 2 is the horizontal plane.

Figure 3:
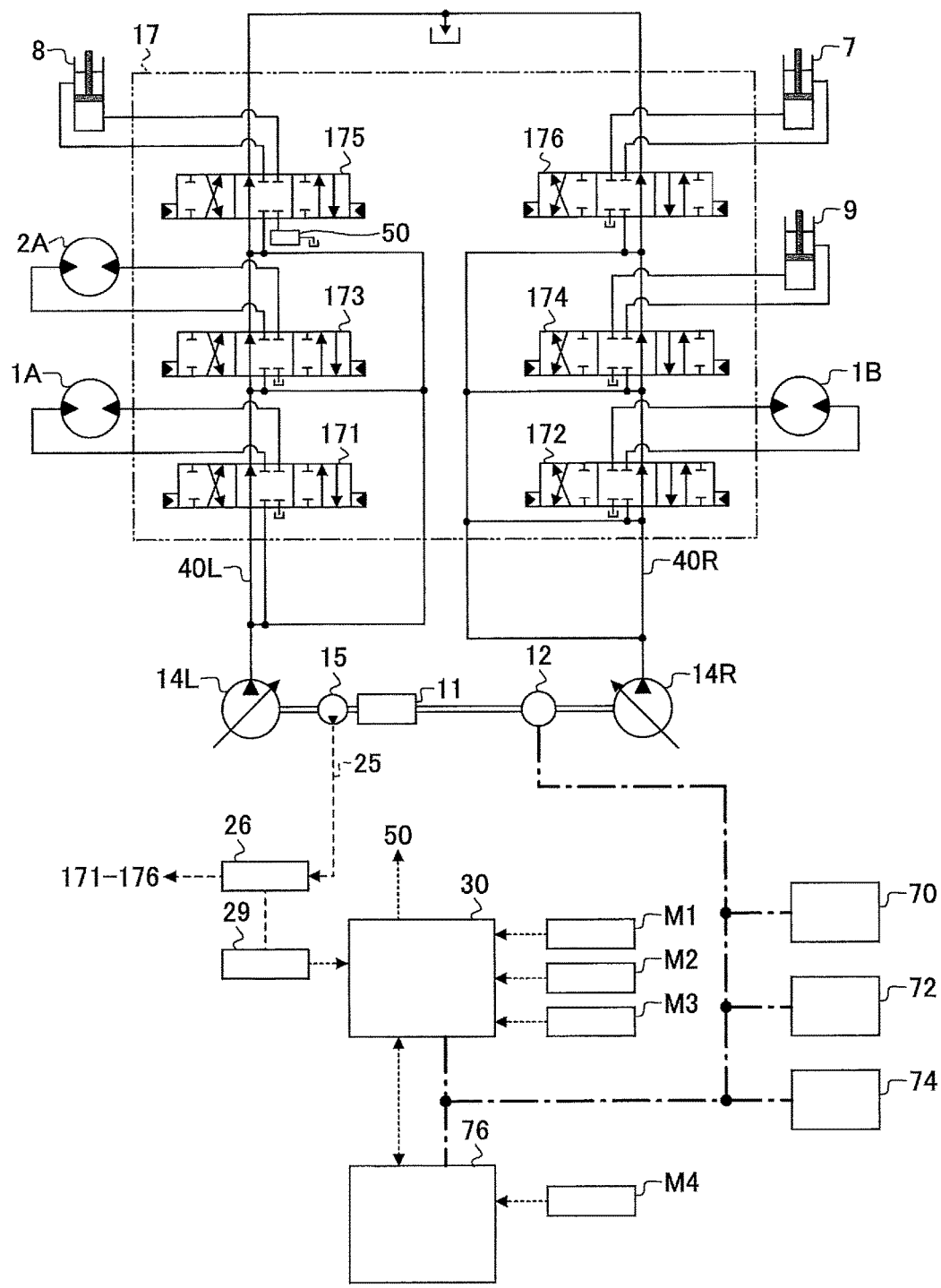
FIG. 3 is a diagram illustrating a configuration example of a driving system mounted to the shovel in FIG. 1.

FIG. 3 is a diagram illustrating a configuration example of a driving system mounted on the shovel in FIG. 1. It indicates a mechanical power transmission line, a high-pressure hydraulic line, a pilot line, an electric control line, and an electric power line by a double line, a solid line, a dashed line, a dotted line, and a dashed dotted line, respectively.

The driving system of the shovel mainly includes an engine 11, an electric generator 12, main pumps 14L, 14R, a pilot pump 15, a control valve 17, an operating device 26, an operation content detecting device 29, a controller 30, a battery 70, an electric component 72, an electric power feeding device 74, and a display device 76.

The engine 11 is a diesel engine that operates to maintain a predetermined rotating speed, for example. Also, an output shaft of the engine 11 is coupled to respective input shafts of the electric generator 12, the main pumps 14L, 14R, and the pilot pump 15.

The electric generator 12 is a device that generates electric power by a rotation by using a drive force of the engine 11. It supplies electric energy to the controller 30, the battery 70, the electric component 72, the electric power feeding device 74, the display device 76, and the like.

The main pumps 14L, 14R are devices that supply hydraulic oil to the control valve 17 via a high-pressure hydraulic line. It is a swash plate type variable displacement hydraulic pump, for example.

The pilot pump 15 is a device that supplies hydraulic oil to various hydraulic control devices such as the operating device 26 via a pilot line 25. It is a fixed displacement hydraulic pump, for example.

The control valve 17 is a hydraulic control device that controls a hydraulic system in the shovel. Specifically, the control valve 17 includes flow rate control valves 171-176 that control a flow of hydraulic oil discharged from the main pumps 14L, 14R. And, the control valve 17 selectively supplies hydraulic oil discharged from the main pumps 14L, 14R through the flow rate control valves 171-176 to one or more of the boom cylinder 7, the arm cylinder 8, the bucket cylinder 9, the hydraulic travel motor 1A (left), the hydraulic travel motor 1B (right) and a hydraulic swing motor 2A. In what follows, the boom cylinder 7, the arm cylinder 8, the bucket cylinder 9, the hydraulic travel motor 1A (left), the hydraulic travel motor 1B (right) and the hydraulic swing motor 2A are collectively referred to as "hydraulic actuators".

The operating device 26 is a device that an operator uses for operations of the hydraulic actuators. In the present embodiment, the operating device 26 supplies hydraulic oil discharged from the pilot pump 15 through the pilot line 25 to a pilot port of a flow rate control valve corresponding to each of the hydraulic actuators. A pressure (a pilot pressure) of the hydraulic oil supplied to each of the pilot ports depends on an operation direction and an operation amount of a lever or a pedal (not shown) at an operating device 26 corresponding to each of the hydraulic actuators.

The operation content detecting device 29 is a device that detects an operation content of the operating device 26 by an operator. In the present embodiment, the operation content detecting device 29 detects in a form of pressure an operation direction and an operation amount of a lever or a pedal at an operating device 26 corresponding to each of the hydraulic actuators, and outputs the detected value to the controller 30. An operation content of the operating device 26 may be derived by using a sensor other than a pressure sensor, such as a potentiometer, or the like.

The controller 30 is a control device for controlling the shovel. For example, it is made up of a computer having a CPU, a RAM, a non-volatile memory, and the like. Also, the controller 30 loads programs corresponding to various functional elements from a ROM to the RAM, and causes the CPU to execute processes corresponding to the various functional elements.

The battery 70 is a device that accumulates electric energy. For example, it is charged with electric power generated by the electric generator 12. Also, the electric energy in the battery 70 is supplied to the controller 30, the electric component 72, the electric power feeding device 74, the display device 76, and the like.

The electric component 72 is an electric load mounted on the shove. For example, it includes an audio output device, a light device, and the like.

The electric power feeding device 74 is a device for supplying electric energy to an external electric equipment. For example, it includes a receptacle that receives an attachment plug of the external electric equipment. The external electric equipment includes a multi-copter (a drone) for an aerial shoot. For example, an operator can charge a battery of the multi-copter for an aerial shoot by plugging an attachment plug of a power cable extending from the battery of the multi-copter for an aerial shoot into a receptacle of the electric power feeding device 74.

The display device 76 is a device that displays various information. For example, it is an on-machine display installed in the cabin 10. In the present embodiment, the display device 76 is connected to the imaging device M4, and can display an image representing scenery around the shovel captured by the imaging device M4.

The main pumps 14L, 14R driven by the engine 11 circulates hydraulic oil through respective center bypass lines 40L, 40R to a hydraulic oil tank.

The center bypass line 40L is a high-pressure hydraulic line passing through the flow rate control valves 171, 173, and 175 disposed in the control valve 17. Also, the center bypass line 40R is a high-pressure hydraulic line passing through the flow rate control valves 172, 174, and 176 disposed in the control valve 17.

The flow rate control valves 171, 172, and 173 are spool valves that control a flow rate and a flow direction of hydraulic oil flowing into or out of the hydraulic travel motor 1A (left), the hydraulic travel motor 1B (right), and the hydraulic swing motor 2A, respectively.

Also, the flow rate control valves 174, 175, and 176 are spool valves that control a flow rate and a flow direction of hydraulic oil flowing into or out of the bucket cylinder 9, the arm cylinder 8, and the boom cylinder 7, respectively. In the present embodiment, a regeneration hydraulic line 175*a* (see FIG. 6A) is formed inside the flow rate control valve 175. Also, a regeneration release valve 50 is attached between the flow rate control valve 175 and the hydraulic oil tank.

Figure 4:
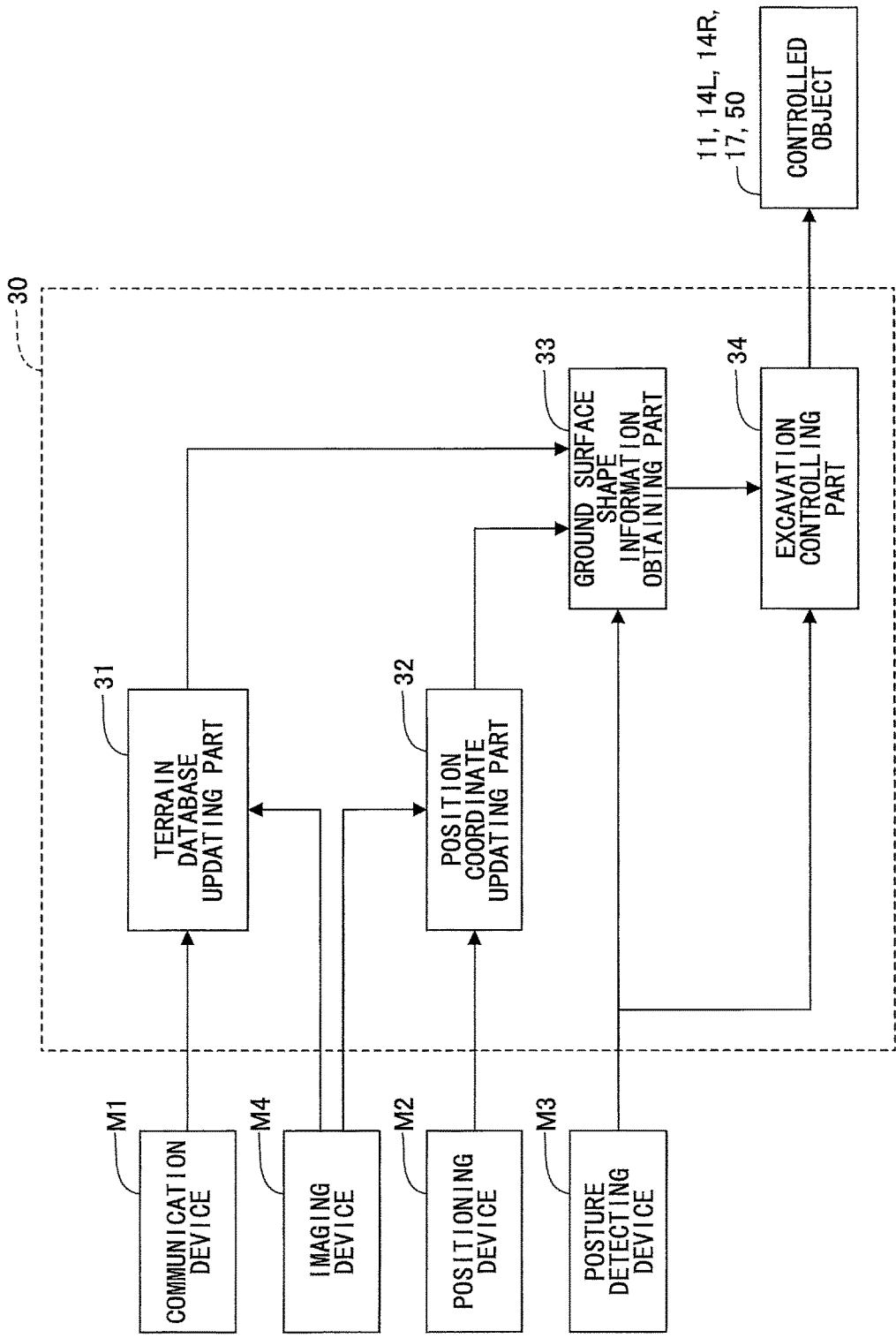
FIG. 4 is a functional block diagram illustrating a configuration example of a controller.

Next, referring to FIG. 4, functions of the controller 30 will be explained. FIG. 4 is a functional block diagram illustrating a configuration example of the controller 30. In the present embodiment, the controller 30 receives outputs from the communication device M1, the positioning device M2, the orientation detecting device M3, and the imaging device M4, executes various calculations, and outputs a control command corresponding to the calculation results to controlled objects (for example, the engine 11, the main pumps 14L, 14R, the control valve 17, the regeneration release valve 50, or the like).

Specifically, the controller 30 mainly includes a terrain database updating part 31, a position coordinate updating part 32, a ground surface shape information obtaining part 33 and an excavation controlling part 34.

The terrain database updating part 31 is a functional element that updates a terrain database that stores terrain information of a workplace referably and systematically. In the present embodiment, the terrain database updating part 31 obtains terrain information of a workplace through the communication device M1 at the time of startup of the shovel, for example, and updates the terrain database. The terrain database is stored in the non-volatile memory or the like. Also, terrain information of a workplace is described in a three-dimensional terrain model based on the world geodetic system, for example.

Also, the terrain database updating part 31 may update the terrain database by utilizing an output of the imaging device M4. In this case, the imaging device M4 may be independent from the shovel. Also, the controller 30 may obtain terrain information output from the imaging device M4 through the communication device M1. Specifically, the imaging device M4 may be attached to a multi-copter for an aerial shoot, a steel tower built at a workplace, or the like, and may obtain terrain information of the workplace based on an image representing scenery of the workplace viewed from above. Also, when the imaging device M4 is attached to the multi-copter for an aerial shoot, the imaging device M4 may capture an image representing scenery of the workplace viewed from above, and may obtain terrain information of the workplace at a frequency of once an hour or in real time.

Also, the terrain database updating part 31 may update the terrain database by obtaining terrain information of a workplace through the communication device M1 at a frequency of once a day and by obtaining terrain information of a workplace through the imaging device M4 at a frequency of once an hour or in real time, for example.

Also, when the terrain database updating part 31 uses the terrain information obtained though the communication device M1 in combination with the terrain information obtained through the imaging device M4, it may use the terrain information obtained through the imaging device M4 to correct the terrain information obtained through the communication device M1. In this case, the terrain database updating part 31 may correct terrain information with a period (an interval) longer than a period (an interval) with which the communication device M1 obtains terrain information.

The position coordinate updating part 32 is a functional element that updates a coordinate and a direction that indicate a current position of the shovel. In the present embodiment, the position coordinate updating part 32 obtains a position coordinate and a direction of the shovel in the world geodetic system based on an output from the positioning device M2, and updates data stored in a non-volatile memory or the like relating to a coordinate and a direction that indicate a current position of the shovel.

Also, similar to the case of the terrain database updating part 31, the position coordinate updating part 32 may update a coordinate and a direction that indicate a current position of the shovel by using an output from the imaging device M4. In this case, the position coordinate updating part 32 may update data relating to a coordinate and a direction that indicate a current position of the shovel in real time by using an output from the positioning device M2 in combination with an output from the imaging device M4. Also, the position coordinate updating part 32 may update data relating to a coordinate and a direction that indicate a current position of the shovel in real time, based only on an output from the imaging device M4.

The ground surface shape information obtaining part 33 is a functional element that obtains information relating to a current shape of a ground surface at a workplace. In the present embodiment, the ground surface shape information obtaining part 33 obtains information relating to a current shape of an excavation target ground surface based on terrain information updated by the terrain database updating part 31, a coordinate and a direction that indicate a current position of the shovel updated by the position coordinate updating part 32, and a past transition of an orientation of the excavation attachment detected by the orientation detecting device M3.

Figure 5:
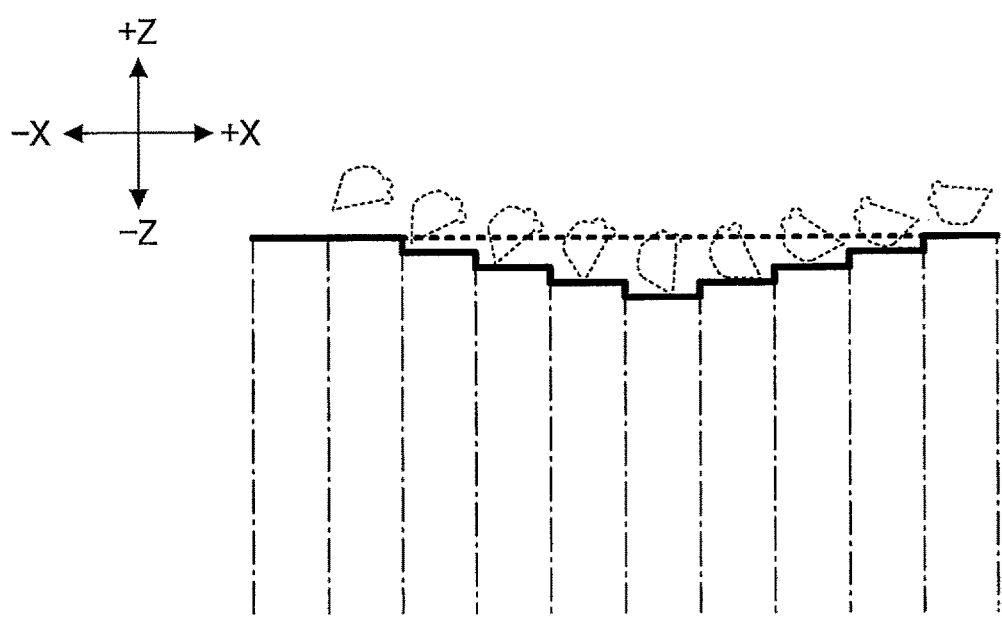
FIG. 5 is a conceptual diagram of information about a current shape of an excavation target ground surface obtained by a ground surface shape information obtaining part.

FIG. 5 is a conceptual diagram of information relating to a current shape of an excavation target ground surface obtained by the ground surface shape information obtaining part 33. A plurality of bucket shapes indicated by a dashed line in FIG. 5 represents a trajectory of the bucket 6 in the previous excavating operation. The trajectory of the bucket 6 is derived from a transition of an orientation of the excavation attachment previously detected by the orientation detecting device M3. Also, a thick solid line in FIG. 5 represents a current cross-sectional shape of an excavation target ground surface that has been recognized by the ground surface shape information obtaining part 33. A thick dotted line represents a cross-sectional shape of an excavation target ground surface that is at a time before the previous excavating operation has been performed and that has been recognized by the ground surface shape information obtaining part 33. That is, the ground surface shape information obtaining part 33 derives a current shape of an excavation target ground surface by removing a portion corresponding to a space where the bucket 6 has passed through during the previous excavating operation from the shape of the excavation target ground surface at a time before the previous excavating operation has been performed. Also, each block that extends in a Z-axis direction indicated by a dashed dotted line in FIG. 5 represents each element in the three-dimensional terrain model. Each element is represented by, for example, a model having a unit area a top face of which is parallel to XY plane and having an infinite length in –Z direction. The three-dimensional terrain model may be represented by a three-dimensional mesh model.

The excavation controlling part 34 is a functional element that controls the excavation attachment. In the present embodiment, the excavation controlling part 34 controls the excavation attachment based on information relating to a current shape of an excavation target ground surface obtained by the ground surface shape information obtaining part 33.

Specifically, the excavation controlling part 34 determines an excavating state based on a current orientation of the excavation attachment detected by the orientation detecting device M3 and information relating to a current shape of an excavation target ground surface obtained by the ground surface shape information obtaining part 33 (information derived from an orientation information during the previous excavating operation). For example, the excavation controlling part 34 determines whether a tooth tip of the bucket 6 is in contact with the excavation target ground surface. Then, when the excavation controlling part 34 has determined that the tooth tip of the bucket 6 is in contact with the excavation target ground surface, it switches a control mode from "ground surface mode" to "underground mode". Particularly, in closing the arm 5 when the excavation attachment (the tooth tip of the bucket 6) is above the ground surface, it is desirable to cause the arm 5 to descend under its own weight by making the pressure in the rod side hydraulic chamber of the arm cylinder 8 higher than the pressure in the bottom side hydraulic chamber. Also, in an excavating operation after the ground surface contact, for excavation, it is necessary to make the pressure in the bottom side hydraulic chamber of the arm cylinder 8 higher than the pressure in the rod side hydraulic chamber. To that end, the excavation controlling part 34 precisely determines whether the bucket 6 is in contact with the excavation target ground surface in order to start an excavation smoothly. On that basis, it supplies the high-pressure hydraulic oil discharged from the main pumps 14L, 14R to the bottom side hydraulic chamber of the arm cylinder 8. Then, in a case where the controlled object is, for example, the regeneration release valve 50, the excavation controlling part 34 increases an opening area of the regeneration release valve 50 by outputting a control command thereto when the tooth tip of the bucket 6 comes in contact with the excavation target ground surface. The expression "when it comes in contact with" includes "just before it comes in contact with". Preferably, the excavation controlling part 34 increases the opening area by outputting a control command to the regeneration release valve 50 just before the tooth tip of the bucket 6 comes in contact with the excavation target ground surface. In addition, it may control the excavation attachment based on preliminarily entered soil density information. For example, the greater the soil density is, the greater the opening area may become.

In addition, the excavation controlling part 34 may employ the engine 11, the main pumps 14L, 14R, or the like as the controlled object. In this case, it switches the control mode from "ground surface mode" to "underground mode" when it determines that the bucket 6 is in contact with the excavation target ground surface. Then, it increases an output horsepower of the excavation attachment by increasing a rotating speed command for the engine 11 or by changing tilt angles of swash plates of the main pumps 14L, 14R. As a result, it can increase a drive force for the excavation attachment when it is working at "underground mode". In addition, it can improve fuel economy by decreasing the output horsepower during "ground surface mode".

The excavation controlling part 34 may execute each control of the above described controlled objects individually or in combination. Also, this control may continue to be executed until an actual shape of the excavation target ground surface becomes a target shape. For example, it may continue to be executed until a depth of the excavation target ground surface reaches a depth of a predetermined target plane. When a depth of the excavation target ground surface has reached the depth of the target plane, an excavation deeper than the depth of the target plane may be restricted.

Figure 6A:
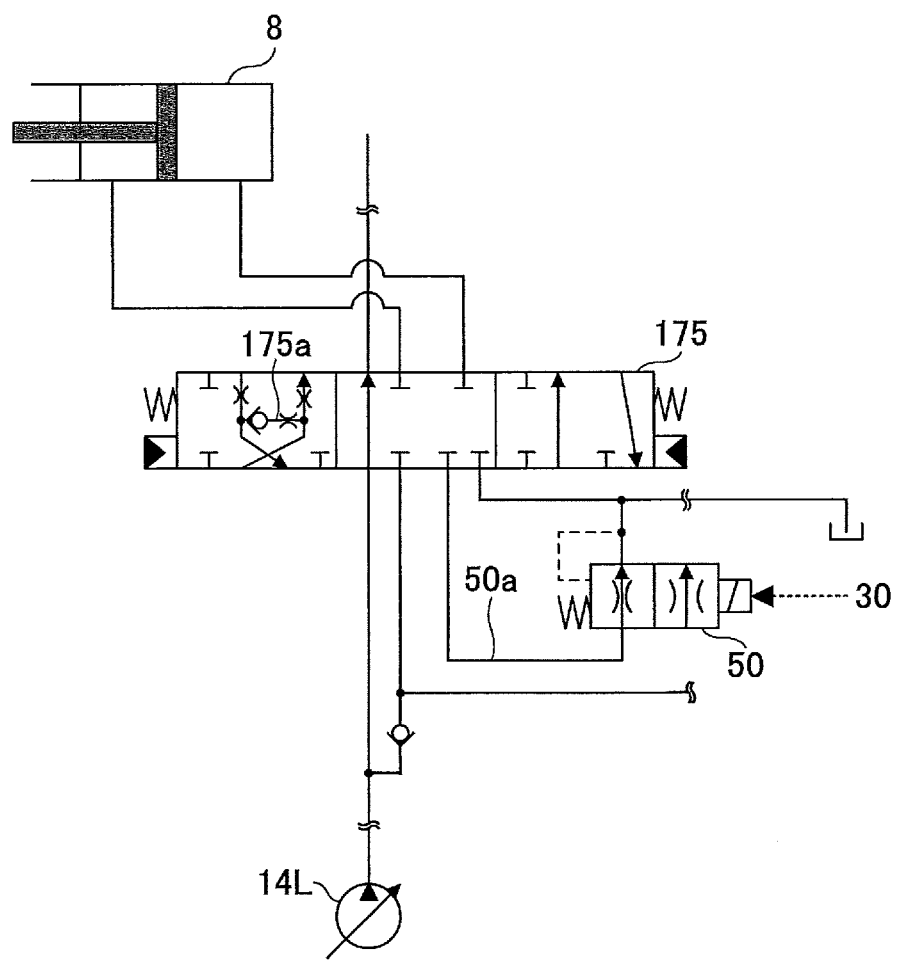
FIG. 6A is a diagram illustrating a configuration example of a regeneration hydraulic line and a regeneration release valve.
Figure 6B:
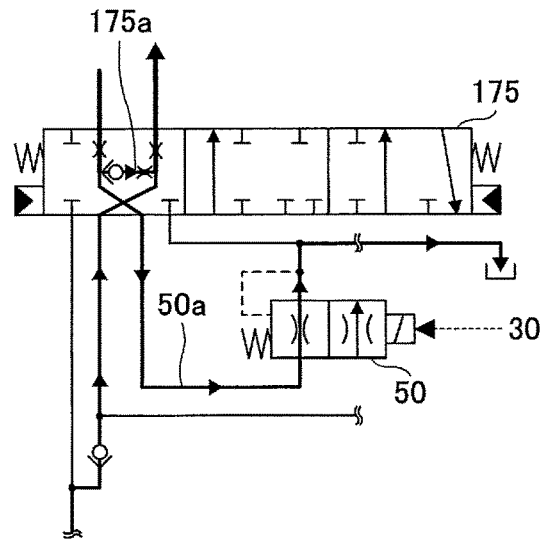
FIG. 6B is a diagram illustrating a flow of hydraulic oil when an opening area of the regeneration release valve has been minimized at the time of an arm closing operation.
Figure 6C:
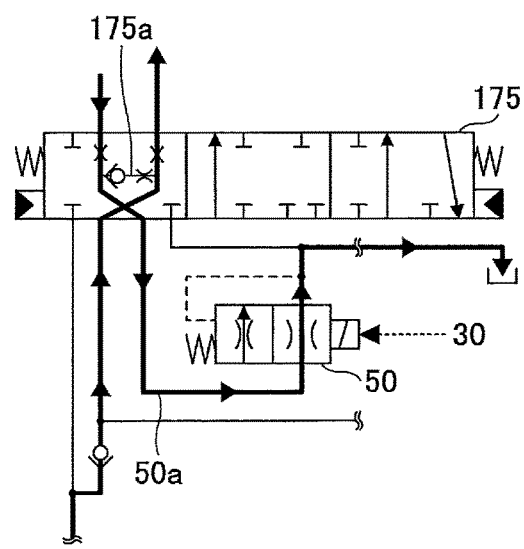
FIG. 6C is a diagram illustrating a flow of hydraulic oil when an opening area of the regeneration release valve has been maximized at the time of an arm closing operation.

FIGS. 6A-6C are diagrams illustrating a configuration example of the regeneration hydraulic line 175a and the regeneration release valve 50. Specifically, FIG. 6A is an enlarged view of a part of the control valve 17 illustrated in FIG. 3 including the flow rate control valve 175 and the regeneration release valve 50. Also, FIG. 6B illustrates a flow of hydraulic oil when an opening area of the regeneration release valve 50 has been minimized at an arm closing operation, FIG. 6C illustrates a flow of hydraulic oil when an opening area of the regeneration release valve 50 has been maximized at an arm closing operation.

The regeneration hydraulic line 175a is a hydraulic line that causes hydraulic oil flowing out of the rod side hydraulic chamber (a contraction side hydraulic chamber that contracts at an arm closing operation) of the arm cylinder 8 to flow into (to be regenerated into) the bottom side hydraulic chamber (an extension side hydraulic chamber). Also, the regeneration hydraulic line 175a includes a check valve that prevents hydraulic oil from flowing from the bottom side hydraulic chamber to the rod side hydraulic chamber. The regeneration hydraulic line 175a may be formed outside of the flow rate control valve 175.

The regeneration release valve 50 is a valve that regulates a flow rate of hydraulic oil flowing out of the rod side hydraulic chamber of the arm cylinder 8 and flowing to the hydraulic oil tank. In the present embodiment, the regeneration release valve 50 is an electromagnetic valve that operates in response to a control command from the controller 30. It regulates flow rates of hydraulic oil flowing through each of a hydraulic line 50a and the regeneration hydraulic line 175a by increasing and decreasing a flow passage area of the hydraulic line 50a between the flow rate control valve 175 and the hydraulic oil tank.

Specifically, as shown in FIG. 6B, the regeneration release valve 50 decreases a flow rate of hydraulic oil flowing through the hydraulic line 50a and increases a flow rate of hydraulic oil flowing through the regeneration hydraulic line 175a by decreasing the opening area in response to the control command from the controller 30. Due to this configuration, the regeneration release valve 50 can prevent the arm 5 from descending under its own weight when moving the excavation attachment in the air.

Also, as shown in FIG. 6C, the regeneration release valve 50 increases a flow rate of hydraulic oil flowing through the hydraulic line 50a and decreases or terminates a flow rate of hydraulic oil flowing through the regeneration hydraulic line 175a by increasing the opening area in response to the control command from the controller 30. Due to this configuration, even during an excavation, that is, even in a case where the excavation attachment is in contact with the ground surface, the regeneration release valve 50 can prevent an unnecessary pressure loss from being generated at the hydraulic line 50a and can prevent an excavating force from being decreased.

The regeneration release valve 50 may be disposed between the rod side hydraulic chamber of the arm cylinder 8 and the flow rate control valve 175.

Figure 7:
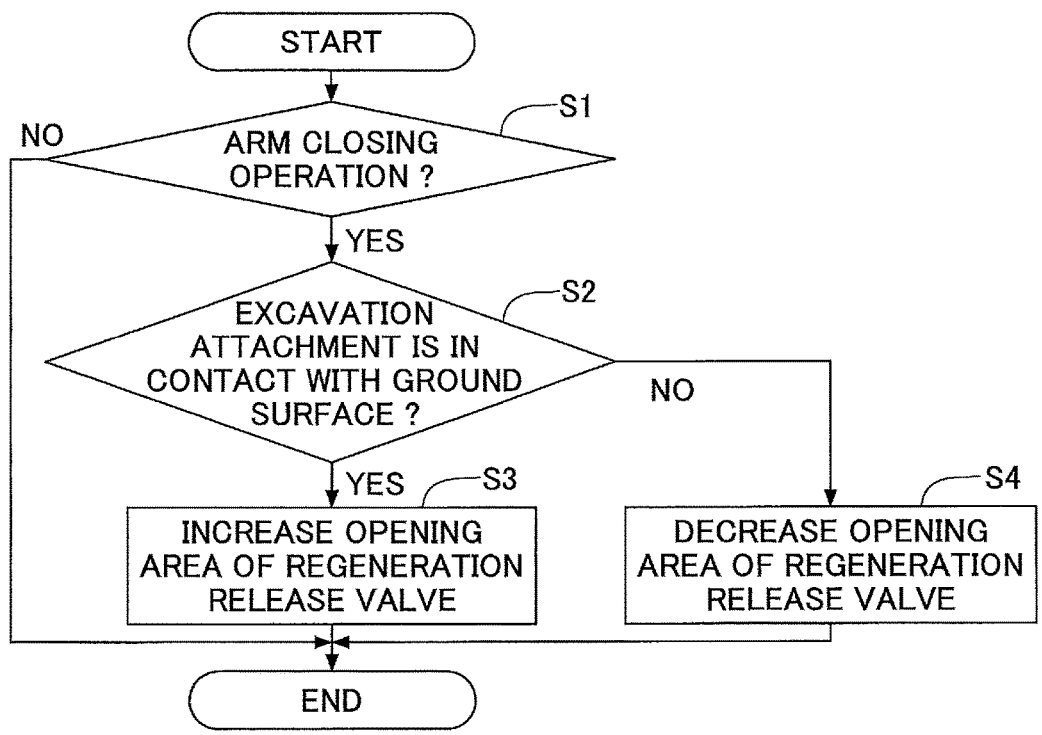
FIG. 7 is a flowchart illustrating a flow of an opening area adjusting process.

Next, referring to FIG. 7, a process where the controller 30 adjusts an opening area of the regeneration release valve 50 (hereinafter referred to as "an opening area adjusting process") will be explained. FIG. 7 is a flowchart illustrating a flow of the opening area adjusting process. The controller 30 executes this opening area adjusting process repeatedly at a predetermined control period while the shovel is in operation.

First, the controller 30 determines whether an arm closing operation is performed (step S1). In the present embodiment, the controller 30 determines whether an arm operating lever has been operated in a closing direction based on an output of the operation content detecting device 29.

When the controller 30 has determined that an arm closing operation has not been performed (NO in step S1), it terminates this opening area adjusting process.

When the controller 30 has determined that an arm closing operation has been performed (YES in step S1), it determines whether the excavation attachment is in contact with a ground surface (step S2). In the present embodiment, the controller 30 determines whether the tooth tip of the bucket 6 is in contact with a ground surface or not based on a current position of the tooth tip of the bucket 6 derived from an output of the orientation detecting device M3 and information relating to a current shape of an excavation target ground surface obtained by the ground surface shape information obtaining part 33.

Then, when the controller 30 has determined that the excavation attachment is in contact with a ground surface (YES in step S2), it increases an opening area of the regeneration release valve 50 as needed (step S3). In the present embodiment, when the controller 30 has determined that the tooth tip of the bucket 6 is in contact with a ground surface, if the opening area is smaller than a predetermined value, it increases the opening area up to the predetermined value.

In contrast, when the controller 30 has determined that the excavation attachment is not in contact with a ground surface (NO in step S2), it decreases an opening area of the regeneration release valve 50 as needed (step S4). In the present embodiment, when the controller 30 has determined that the tooth tip of the bucket 6 is not in contact with a ground surface, if the opening area is larger than a predetermined value, it decreases the opening area down to the predetermined value.

Figure 8:
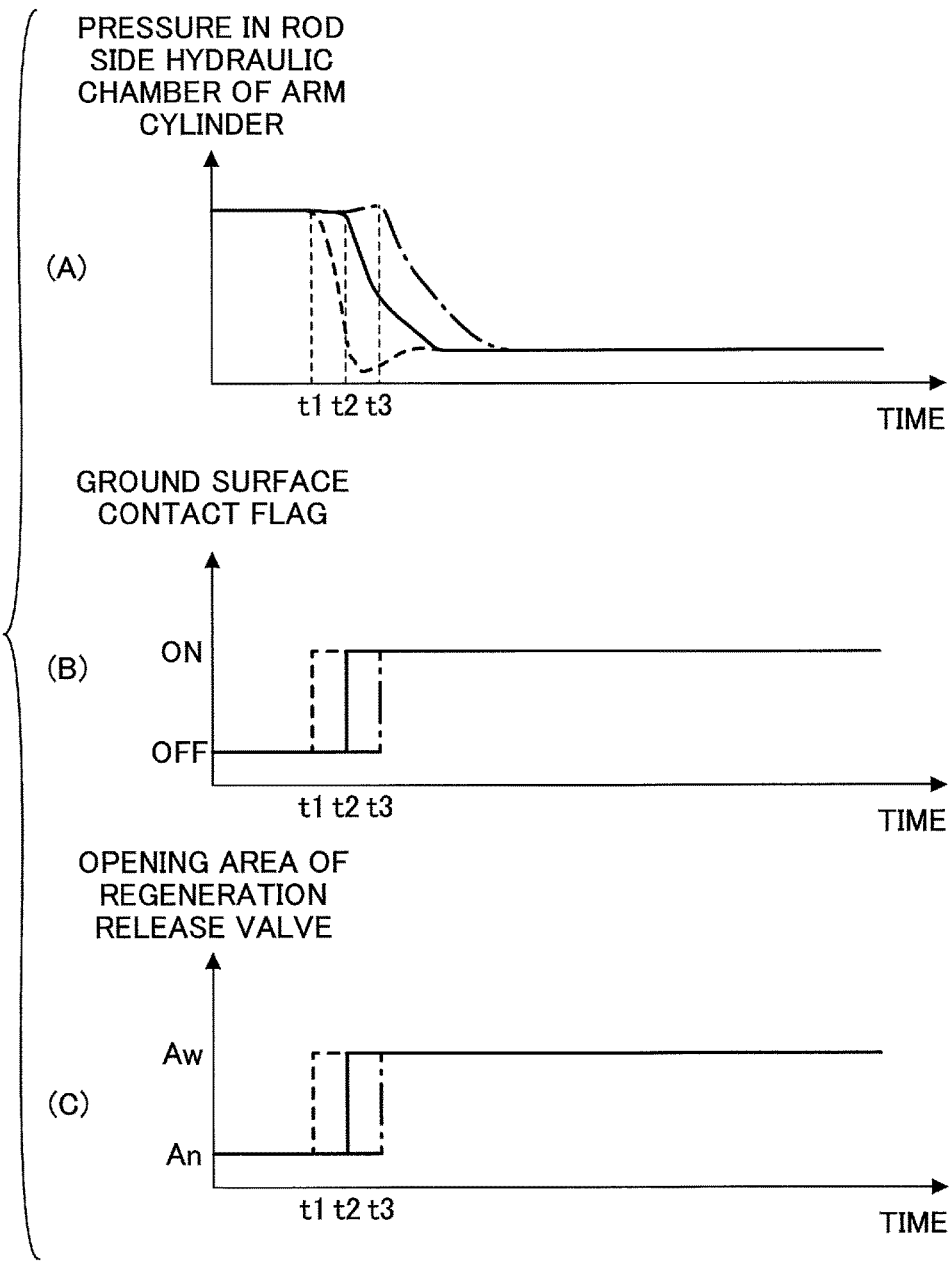
FIG. 8 is a diagram illustrating temporal transitions of various parameters when the controller adjusts the opening area of the regeneration release valve.

Next, referring to FIG. 8, temporal transitions of various parameters when the controller 30 adjusts the opening area of the regeneration release valve 50 will be explained. FIG. 8(A) illustrates a temporal transition of pressure in the rod side hydraulic chamber of the arm cylinder 8. Also, FIG. 8(B) illustrates a temporal transition of a ground surface contact flag, and FIG. 8(C) illustrates a temporal transition of an opening area of the regeneration release valve 50. The temporal axes (abscissa axes) are identical in FIGS. 8(A)-8(C). Also, the ground surface contact flag represents determination results by the controller 30 of whether the excavation attachment is in contact with a ground surface or not. Specifically, a value "OFF" of the ground surface contact flag represents a state where the controller 30 has determined that "there is no contact", while a value "ON" of the ground surface contact flag represents a state where the controller 30 has determined that "there is contact". Also, a transition illustrated by a solid line in FIG. 8 represents a transition in a case where an actual contact and a determination of "there is contact" have occurred simultaneously. In contrast, a transition illustrated by a dashed line in FIG. 8 represents a transition in a case where a determination of "there is contact" has occurred before an actual contact, and a transition illustrated by a dashed dotted line in FIG. 8 represents a transition in a case where a determination of "there is contact" has occurred after an actual contact.

Specifically, when a determination of "there is contact" has been conducted before an actual contact, as indicated by the dashed line in FIG. 8(B), the ground surface contact flag is switched from a value "OFF" to a value "ON" at a time point t1. In the present embodiment, an actual contact occurs at a time point t2. Then, when the controller 30 has switched the ground surface contact flag to a value "ON", it increases an opening area of the regeneration release valve 50. Thus, as indicated by the dashed line in FIG. 8(C), an opening area of the regeneration release valve 50 is adjusted from a value An to a value Aw (>An) at the time point t1. The value An is an opening area preliminarily set as an optimal value when moving the arm 5 in the air, and a value Aw is an opening area preliminarily set as an optimal value when moving the arm 5 during an excavation. As a result, as indicated by the dashed line in FIG. 8(A), pressure in the rod side hydraulic chamber of the arm cylinder 8 begins to decrease at the time point t1, and continues to decrease until an actual contact occurs. This is because the arm 5 descends under its own weight. Then, after an actual contact has occurred at the time point t2 (between the time point t2 and a time point t3), the pressure turns upward and subsequently increases up to a value corresponding to an excavating reaction force as a working reaction force.

In this way, when the controller 30 has determined that "there is contact" before an actual contact, it might rapidly decrease pressure in the rod side hydraulic chamber of the arm cylinder 8 temporarily, and therefore might generate cavitation.

In contrast, when the controller 30 has determined that "there is contact" after an actual contact, an opening area of the regeneration release valve 50 remains small at the time point t2 when an actual contact occurs. Thus, pressure in the rod side hydraulic chamber might increase. Then, as indicated by the dashed dotted line in FIG. 8(B), the ground surface contact flag is switched from a value "OFF" to a value "ON" at the time point t3. Thus, as indicated by the dashed dotted line in FIG. 8(C), an opening area of the regeneration release valve 50 is adjusted from a value An to a value Aw at the time point t3. As a result, as indicated by the dashed dotted line in FIG. 8(A), pressure in the rod side hydraulic chamber of the arm cylinder 8 begins to increase at the time point t2 when an actual contact occurs, and continues to increase until an opening area of the regeneration release valve 50 is increased up to the value Aw at the time point t3. This is because it is affected by an excavating reaction force and pressure loss at the regeneration release valve 50. Then, when an opening area of the regeneration release valve 50 is increased to the value Aw at the time point t3, the pressure turns downward and subsequently decreases down to a value corresponding to an excavating reaction force.

In this way, when the controller 30 has determined that "there is contact" after an actual contact, it might increase pressure in the rod side hydraulic chamber of the arm cylinder 8 temporarily. Thus, it might destabilize a movement of the excavation attachment, and might decrease working efficiency.

In view of the above, the controller 30 determines whether the excavation attachment is in contact with an excavation target ground surface based on a current orientation of the excavation attachment detected by the orientation detecting device M3 and information relating to a current shape of the excavation target ground surface obtained by the ground surface shape information obtaining part 33. This is to determine that "there is contact" at the same time as an actual contact.

When it has been determined that "there is contact" at the same time as an actual contact, as indicated by the solid line in FIG. 8(B), the ground surface contact flag is switched for a value "OFF" to a value "ON" at the time point t2. Thus, as indicated by the solid line in FIG. 8(C), an opening area of the regeneration release valve 50 is adjusted from a value An to a value Aw at the time point t2. As a result, as indicated by the solid line in FIG. 8(A), pressure in the rod side hydraulic chamber of the arm cylinder 8 begins to decrease at the time point t2 when an actual contact occurs, and subsequently decreases down to a value corresponding to an excavating reaction force. It does not rapidly decrease temporarily before an actual contact occurs, and does not increase under the influence of pressure loss at the regeneration release valve 50 after an actual contact has occurred either.

Due to the above configuration, the controller 30 obtains information relating to a current shape of a ground surface as a work target based on a transition of an orientation of the excavation attachment detected by the orientation detecting device M3. Then, it controls the attachment based on the obtained information relating to the current shape of the ground surface as a work target. In the present embodiment, the controller 30 adjusts an opening area of the regeneration release valve 50 based on a current orientation of the excavation attachment and a current shape of an excavation target ground surface. Specifically, it adjusts an opening area of the regeneration release valve 50 based on a current position of the tooth tip of the bucket 6 and a current shape of the excavation target ground surface. Thus, at the same time as the tooth tip of the bucket 6 comes in contact with the excavation target ground surface, it can decrease or eliminate pressure loss at the regeneration release valve 50 associated with hydraulic oil flowing from the rod side hydraulic chamber of the arm cylinder 8 to the hydraulic oil tank. As a result, the controller 30 can more precisely determine whether there has been a contact or not, and can reduce an erroneous determination, in comparison to a case where it determines whether the tooth tip of the bucket 6 is in contact with the excavation target ground surface or not based on a change in an arm cylinder pressure or the like. Also, it can improve operability and working efficiency by reducing an erroneous determination of the presence or absence of the contact. Specifically, at the same time as the tooth tip of the bucket 6 comes in contact with a ground surface, it can decrease or eliminate pressure loss that has been generated purposely at the regeneration release valve 50 for preventing the arm 5 from descending under its own weight, and therefore can prevent a force required for an excavation from increasing by an amount corresponding to the pressure loss. Also, it can prevent the arm 5 from descending under its own weight before a contact with a ground surface, and therefore can prevent generation of cavitation.

Similar to the case of adjusting an opening area of the regeneration release valve 50 associated with the arm cylinder 8, the controller 30 may adjust an opening area of a regeneration release valve (not shown) associated with the boom cylinder 7, or may adjust an opening area of a regeneration release valve (not shown) associated with the bucket cylinder 9.

Figure 9:
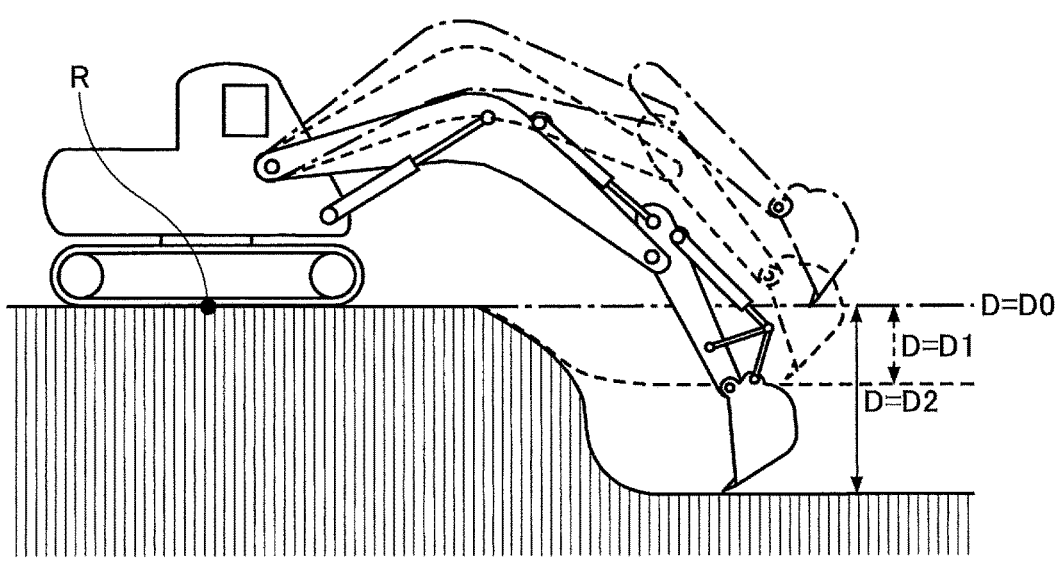
FIG. 9 is a diagram illustrating a relationship of a depth of the excavation target ground surface and a reference plane.

Next, referring to FIGS. 9-11, another example of an excavation attachment control by the excavation controlling part 34 in the controller 30 will be explained. FIG. 9 is a diagram illustrating a relationship of a depth of an excavation target ground surface and a reference plane. The reference plane is a plane that acts as a reference for determining a depth of an excavation target ground surface. In the present embodiment, the reference plane is a horizontal plane whether the center point R of the shovel is located on. The center point R is an intersection point of a swing axis of the shovel and a contact ground plane of the lower travelling body 1.

Specifically, the excavation attachment indicated by a dashed dotted line in FIG. 9 represents an orientation of the excavation attachment when excavating an excavation target ground surface at the same depth as the reference plane indicated by a dashed dotted line. In this case, a depth D of the excavation target ground surface is the same as a depth D0 (=0) of the reference plane. The depth D of the excavation target ground surface is derived based on information relating to a current shape of an excavation target ground surface obtained by the ground surface shape information obtaining part 33 (information calculated from an orientation information during the previous excavating operation). Also, the depth D of the excavation target ground surface may be derived based on a current orientation of the excavation attachment detected by the orientation detecting device M3.

Also, the excavation attachment indicated by a dashed line in FIG. 9 represents an orientation of the excavation attachment when excavating an excavation target ground surface indicated by a dashed line. In this case, a depth D of the excavation target ground surface is indicated by a depth D1 (>D0).

Also, the excavation attachment indicated by a solid line in FIG. 9 represents an orientation of the excavation attachment when excavating an excavation target ground surface indicated by a solid line. In this case, a depth D of the excavation target ground surface is indicated by a depth D2 (>D1).

An excavation target ground surface may be at a level higher than the reference plane. In this case, a depth D of the excavation target ground surface may be represented by a negative value.

Figure 10:
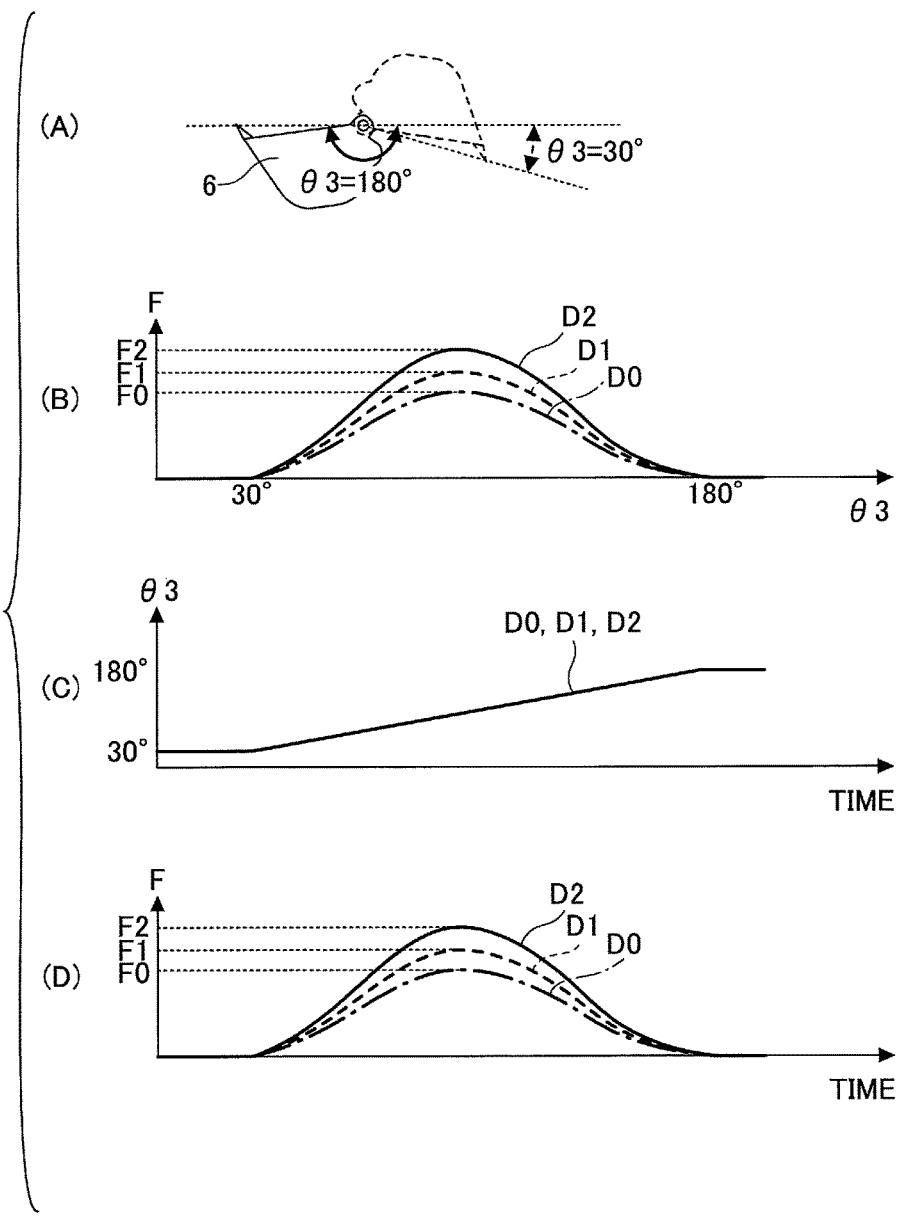
FIG. 10 is a diagram illustrating a relationship of a bucket angle, an excavating reaction force, and a depth of an excavation target ground surface.

FIG. 10 is a diagram illustrating a relationship of a bucket angle θ3, an excavating reaction force F, and a depth D of an excavation target ground surface. Specifically, FIG. 10(A) illustrates a transition of an orientation of the bucket 6 when closing the bucket 6 from a bucket angle 30° to a bucket angle 180°. The bucket 6 indicated by a dashed line in FIG. 10(A) represents its orientation at a bucket angle 30°, and the bucket 6 indicated by a solid line in FIG. 10(A) represents its orientation at a bucket angle 180°.

FIG. 10(B) illustrates an example of contents of an association table that preliminarily stores a correspondence relationship of a depth D of an excavation target ground surface and a transition or a peak value of an excavating reaction force F in a case where a predetermined bucket closing operation is performed. Specifically, FIG. 10(B) illustrates a transition of an excavating reaction force F associated with a bucket angle θ3 when closing the bucket 6 from a bucket angle 30° to a bucket angle 180°. The association table is a data table generated based on an analysis of actual measured data, and is preliminarily stored in a non-volatile memory, for example.

Also, FIG. 10(C) illustrates a temporal transition of a bucket angle θ3, and FIG. 10(D) illustrates a temporal transition of an excavating reaction force F calculated by using the association table illustrated by FIG. 10(B). The respective temporal axes (abscissa axes) are identical in FIGS. 10(C) and 10(D).

Also, transitions indicated by dashed dotted lines in FIGS. 10(B) and 10(D) represent transitions when a depth D of an excavation target ground surface is the depth D0. Also, transitions indicated by dashed lines represent transitions when a depth D of an excavation target ground surface is the depth D1, and transitions indicated by solid lines represent transitions when a depth D of an excavation target ground surface is the depth D2.

In a case where a bucket closing operation from a bucket angle 30° to a bucket angle 180° as shown in FIGS. 10(A) and 10(C) has been performed, as shown in FIG. 10(B), an excavating reaction force F turns downward after a bucket angle θ3 has increased up to a certain angle (e.g. 100°), and reaches a zero when a bucket angle θ3 has reached 180°. This trend is similar independently of a depth D of an excavation target ground surface. However, a peak value of an excavating reaction force F changes depending on a change in a depth D of an excavation target ground surface. FIGS. 10(B) and 10(D) show as an example a trend the deeper a depth D of an excavation target ground surface is the higher a peak value of an excavating reaction force F becomes.

In view of the above, the excavation controlling part 34 in the controller 30 derives a current depth D of an excavation target ground surface based on information relating to a current shape of an excavation target ground surface obtained by the ground surface shape information obtaining part 33. Then, the excavation controlling part 34 estimates depending on the current depth D of the excavation target ground surface a peak value of an excavating reaction force F in a case where a predetermined bucket closing operation is performed. Subsequently, the excavation controlling part 34 determines whether a peak value of the estimated excavating reaction force F exceeds a predetermined value. Then, when the excavation controlling part 34 has determined that the peak value exceeds the predetermined value, it regulates a movement of the excavation attachment so that the peak value may not exceed the predetermined value. This is to prevent a movement of the excavation attachment from being destabilized due to an excessive excavating reaction force F. For example, in spite of the presence or absence of a boom lifting manipulation by an operator, the excavation controlling part 34 automatically lifts the boom 4 during a bucket closing operation so that the peak value of the excavating reaction force F may not exceed the predetermined value. For example, the excavation controlling part 34 automatically lifts the boom 4 at a lifting rate (a pivot angle per unit time of the boom 4) practically unnoticeable to an operator. Thus, the excavation controlling part. 34 can smooth a movement of the excavation attachment without making an operator notice that the boom 4 has lifted automatically, and therefore can improve an operational feeling. An object controlled by the excavation controlling part 34 in this case is not the regeneration release valve 50 but the flow rate control valve 176. For example, the excavation controlling part 34 automatically displaces the flow rate control valve 176 by outputting a control command to an electromagnetic valve (not shown) that increases and decreases a pilot pressure of the flow rate control valve 176. Also, this control may continue to be executed until an actual shape of an excavation target ground surface take the form of a target shape. For example, it may continue to be executed until a depth of an excavation target ground surface reaches a predetermined depth of a target plane. In a case where a depth of an excavation target ground surface has reached the depth of the target plane, a deeper excavation may be restricted.

FIG. 11 is a flowchart illustrating a flow of a process where the controller 30 automatically adjusts an orientation of the excavation attachment so that a peak value of an excavating reaction force F may not exceed a predetermined value (hereinafter referred to as "automatic orientation adjusting process"). The controller 30 executes this automatic orientation adjusting process repeatedly at a predetermined control period while the shovel is in operation.

First, the controller 30 determines whether an excavating operation has been performed (step S11). In the present embodiment, the controller 30 determines whether at least one of a boom operation, an arm operation, and a bucket operation based on an output of the operation content detecting device 29.

Then, when the controller 30 has determined that an excavating operation has been performed (YES in step S11), it determines whether the excavation attachment is in contact with a ground surface (step S12). In the present embodiment, the controller 30 determines whether the tooth tip of the bucket 6 is in contact with the ground surface based on a current position of the tooth tip of the bucket 6 derived from an output of the orientation detecting device M3 and information relating to a current shape of an excavation target ground surface obtained by the ground surface shape information obtaining part 33.

Then, when the controller has determined that the excavation attachment is in contact with the ground surface (YES in step S12), it estimates a peak value of an excavating reaction force F (step S13). In the present embodiment, the controller 30 derives a current depth D of the excavation target ground surface based on the information relating to a current shape of the excavation target ground surface obtained by the ground surface shape information obtaining part 33. Then, the controller 30 estimates based on a current depth D of the excavation target ground surface a peak value of the excavating reaction force F for a case where a predetermined bucket closing operation is performed. Specifically, the controller 30 derives a peak value of the excavating reaction force F corresponding to a current depth D of the excavation target ground surface by referring to the association table illustrated by FIG. 10(B). Also, the controller 30 may calculate in real time a peak value of the excavating reaction force F for a case where a predetermined bucket closing operation is performed, based on a current depth D of the excavation target ground surface. Also, the controller 30 may take into account a soil density or the like when calculating the peak value. The soil density may be a value entered by an operator through an on-machine input device (not shown), or may be a value automatically calculated based on outputs of various sensors such as a cylinder pressure sensor or the like.

Subsequently, the controller 30 determines whether the estimated peak value of the excavating reaction force F exceeds a predetermined value Fth (step S14).

Then, when the controller 30 has determined that the peak value exceeds the predetermined value Fth (YES in step S14), it automatically adjusts an orientation of the excavation attachment during the bucket closing operation (step S15). In the present embodiment, the controller 30 automatically lifts the boom 4 during the bucket closing operation, in spite of the presence or absence of a boom lifting manipulation by an operator. Specifically, it automatically lifts the boom 4 in a predetermined moving pattern depending on a change in a bucket angle θ3.

When the controller 30 has determined that an excavating operation has not been performed (NO in step S11), that the excavation attachment is not in contact with a ground surface (NO in step S12), or that a peak value is less than or equal to the predetermined value Fth (NO in step S14), it terminates this automatic orientation adjusting process without automatically adjusting an orientation of the excavation attachment.

Due to the above configuration, the controller 30 obtains information relating to a current shape of a ground surface as a work target based on a transition of an orientation of an attachment detected by the orientation detecting device M3. Then, it controls the attachment based on the obtained information relating to a current shape of a ground surface as a work target. In the present embodiment, the controller 30 can prevent a peak value of the excavating reaction force F from exceeding the predetermined value Fth during a bucket closing operation. Thus, it can prevent a movement of the excavation attachment from being destabilized due to an excessive excavating reaction force F, and therefore can improve operability and working efficiency of the shovel. Also, the controller 30 can produce similar effects at a work other than an excavation work such as a floor digging work, a leveling work, or the like, by using the predetermined value Fth that is set relatively low.

According to certain embodiments, it is possible to provide a shovel that can recognize a current shape of a ground surface to be excavated.

It should be understood that the invention is not limited to the above-described embodiments, but may be modified into various forms on the basis of the spirit of the invention. Additionally, the modifications are included in the scope of the invention.

For example, in the above embodiments, the controller 30 determines whether the excavation attachment is in contact with the excavation target ground surface based on a current orientation of the excavation attachment detected by the orientation detecting device M3 and information relating to a current shape of the excavation target ground surface obtained by the ground surface shape information obtaining part 33. Then, when it has determined that there is contact, it outputs a control command to the regeneration release valve 50 to increase an opening area thereof. Alternatively, when it has determined that there is contact, it estimates a peak value of the excavating reaction force F for a case where a predetermined bucket closing operation is performed. Then, in a case where the estimated peak value exceeds the predetermined value Fth, it automatically lifts the boom 4 so that an actual peak value may be less than or equal to the predetermined value Fth. However, the present invention shall not be limited to these configurations. For example, the controller 30 may increase a drive force for an attachment (e.g. excavating force by the excavation attachment) when it has determined that there is contact. Specifically, the controller 30 may increase a rotating speed of the engine 11, and may increase a discharge rate of the main pumps 14L, 14R. An object controlled by the excavation controlling part 34 in this case is not the regeneration release valve 50 but the engine 11 or regulators associated with the main pumps 14L, 14R.

Also, the controller 30 may automatically lift the boom 4 when it has determined that a peak value of the excavating reaction force F exceeds the predetermined value Fth, even in a case of a remote operation or an automatic excavating operation (an unmanned operation) of the shovel. This is to continue a smooth excavation work by decreasing the excavating reaction force F.

What is claimed is:

1. A shovel comprising:
a lower travelling body;
an upper swinging body mounted on the lower travelling body;
an attachment attached to the upper swinging body;
sensors on a boom, an arm and/or a bucket, the sensors configured to detect an orientation of the attachment; and
a control device configured to control the attachment based on information relating to a current shape of a ground surface, the information being obtained based on a transition of the orientation calculated from values detected by the sensors on the boom, the arm and/or the bucket.

2. The shovel as claimed in claim 1,
wherein the control device determines whether the attachment is in contact with the ground surface based on the orientation of the attachment detected by the sensors and the obtained information relating to the current shape of the ground surface.

3. The shovel as claimed in claim 1,
wherein the control device changes a control mode at a time of contact between the attachment and the ground surface.

4. The shovel as claimed in claim 2, comprising:
a hydraulic cylinder configured to move a working element constituting the attachment;
a regeneration hydraulic line configured to cause hydraulic oil flowing out of a contraction side hydraulic chamber of the hydraulic cylinder during movement of the working element to flow into an extension side hydraulic chamber of the hydraulic cylinder; and
a regeneration release valve disposed between the hydraulic cylinder and a hydraulic oil tank;
wherein the control device increases an opening area of the regeneration release valve when it has determined that the attachment is in contact with the ground surface.

5. The shovel as claimed in claim 1,
wherein the control device obtains a depth of the ground surface with respect to a reference plane based on the obtained information relating to the current shape of the ground surface, and controls the attachment depending on the depth.

6. The shovel as claimed in claim 5,
wherein the control device controls the orientation of the attachment depending on a working reaction force corresponding to the depth.

7. The shovel as claimed in claim 1,
wherein the control device increases drive force by the attachment when it has determined that the attachment is in contact with the ground surface.

8. A method of controlling a shovel comprising a lower travelling body, an upper swinging body mounted on the lower travelling body, an attachment attached to the upper swinging body, sensors on a boom, an arm, and/or a bucket, the sensors configured to detect an orientation of the attachment, and a control device, the method comprising:
controlling, by the control device, the attachment based on information relating to a current shape of a ground surface, the information being obtained based on a transition of the orientation calculated from values detected by the sensors on the boom, the arm and/or the bucket.

9. The method as claimed in claim 8,
wherein the control device determines whether the attachment is in contact with the ground surface based on the orientation of the attachment detected by the sensors and the obtained information relating to the current shape of the ground surface.

* * * * *